United States Patent
Wang et al.

(10) Patent No.: US 12,462,544 B2
(45) Date of Patent: Nov. 4, 2025

(54) METHOD AND APPARATUS FOR IMAGE CLASSIFICATION

(71) Applicant: Telefonaktiebolaget LM Ericsson (publ), Stockholm (SE)

(72) Inventors: Xiaohui Wang, Guangdong (CN); Guansheng Liang, Guangdong (CN); Qian Sun, Guangdong (CN); Zhijin Zhang, Guangdong (CN); Xing Liu, Jiangsu (CN); Hui Weng, Jiangsu (CN); Bo Zhou, Jiangsu (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 713 days.

(21) Appl. No.: 17/777,080

(22) PCT Filed: Jan. 23, 2020

(86) PCT No.: PCT/CN2020/073965
§ 371 (c)(1),
(2) Date: May 16, 2022

(87) PCT Pub. No.: WO2021/147066
PCT Pub. Date: Jul. 29, 2021

(65) Prior Publication Data
US 2022/0415019 A1    Dec. 29, 2022

(51) Int. Cl.
*G06V 10/82* (2022.01)
*G06V 10/762* (2022.01)
(Continued)

(52) U.S. Cl.
CPC ............ *G06V 10/82* (2022.01); *G06V 10/762* (2022.01); *G06V 10/764* (2022.01); *G06V 10/774* (2022.01); *G06V 2201/06* (2022.01)

(58) Field of Classification Search
CPC .... G06V 10/82; G06V 10/762; G06V 10/764; G06V 10/774; G06V 2201/06;
(Continued)

(56) References Cited

U.S. PATENT DOCUMENTS 10,373,026 B1 *   8/2019   Kim ...................... G06F 18/217
10,824,942 B1 * 11/2020   Bhotika ................. G06N 3/08
(Continued)

FOREIGN PATENT DOCUMENTS

CN    106779073 A    5/2017
CN    108764005 A   11/2018
(Continued)

OTHER PUBLICATIONS

Chinese Office Action with English language machine translation dated Nov. 20, 2024 for Patent Application No. 202080082181.0, consisting of 16 pages.
(Continued)

*Primary Examiner* — Michael S Osinski
(74) *Attorney, Agent, or Firm* — Weisberg I.P. Law, P.A.

(57) ABSTRACT

Embodiments of the present disclosure provide a method and an apparatus for image classification. The method includes receiving an image to be classified; inputting the image to a discriminator of a first Generative Adversarial Network, GAN; and outputting a result indicating real and an index of a predetermined classification, or a result indicating fake.

16 Claims, 16 Drawing Sheets

(51) Int. Cl.
*G06V 10/764* (2022.01)
*G06V 10/774* (2022.01)

(58) Field of Classification Search
CPC . G06T 2207/20081; G06T 2207/20084; G06T 2207/30168; G06T 7/0002; G06F 18/24; G06F 18/24133; G06N 3/0475; G06N 3/08; G06N 3/088; G06N 3/09; G06N 3/094

See application file for complete search history.

(56) References Cited

U.S. PATENT DOCUMENTS

| | | | |
|---|---|---|---|
| 10,832,092 B2* | 11/2020 | Shaubi | G06N 3/047 |
| 11,003,959 B1* | 5/2021 | Levner | G06V 10/762 |
| 11,003,995 B2* | 5/2021 | Rezagholizadeh | G06N 3/08 |
| 11,100,632 B2* | 8/2021 | Han | G06V 10/82 |
| 11,373,285 B2* | 6/2022 | Higa | G06T 7/0002 |
| 11,501,438 B2* | 11/2022 | Xu | G06T 5/60 |
| 11,797,705 B1* | 10/2023 | Voinea | G06F 21/6245 |
| 12,120,384 B2* | 10/2024 | Mathews | G06N 3/04 |
| 12,262,981 B1* | 4/2025 | Shao | A61B 5/0507 |
| 2009/0048842 A1* | 2/2009 | Albrecht | G06V 10/764 704/260 |
| 2013/0109051 A1* | 5/2013 | Li | G06T 7/0012 435/288.7 |
| 2017/0337449 A1* | 11/2017 | Hamada | G06V 20/00 |
| 2018/0144003 A1* | 5/2018 | Formoso | G06N 5/022 |
| 2018/0225823 A1* | 8/2018 | Zhou | G06T 7/11 |
| 2018/0300865 A1* | 10/2018 | Weiss | G06T 7/10 |
| 2018/0322366 A1 | 11/2018 | Lim et al. | |
| 2018/0336439 A1* | 11/2018 | Kliger | G06N 3/088 |
| 2018/0336471 A1* | 11/2018 | Rezagholizadeh | G06N 3/08 |
| 2019/0065594 A1* | 2/2019 | Lytkin | G06F 16/9536 |
| 2019/0080205 A1 | 3/2019 | Kaufhold et al. | |
| 2019/0096056 A1 | 3/2019 | Giering et al. | |
| 2019/0122072 A1* | 4/2019 | Cricrì | G06V 20/46 |
| 2019/0122120 A1* | 4/2019 | Wu | G06N 3/084 |
| 2019/0147333 A1* | 5/2019 | Kallur Palli Kumar | G06V 10/451 706/25 |
| 2019/0147343 A1* | 5/2019 | Lev | G06F 7/023 706/25 |
| 2019/0147582 A1* | 5/2019 | Lee | G06T 11/00 382/156 |
| 2019/0197358 A1* | 6/2019 | Madani | G06N 3/045 |
| 2019/0197368 A1* | 6/2019 | Madani | G16H 30/40 |
| 2019/0198156 A1* | 6/2019 | Madani | G06N 3/082 |
| 2019/0236614 A1* | 8/2019 | Burgin | G06V 10/764 |
| 2019/0286950 A1* | 9/2019 | Kiapour | G06F 16/532 |
| 2019/0385019 A1 | 12/2019 | Bazrafkan et al. | |
| 2019/0392624 A1* | 12/2019 | Elgammal | G06N 3/045 |
| 2020/0020098 A1* | 1/2020 | Odry | G06T 7/0012 |
| 2020/0175329 A1* | 6/2020 | Malaya | G06V 10/82 |
| 2020/0193269 A1* | 6/2020 | Park | G06V 10/82 |
| 2020/0210768 A1* | 7/2020 | Turkelson | G06T 7/0002 |
| 2020/0242479 A1* | 7/2020 | Kim | G06V 20/41 |
| 2020/0242481 A1* | 7/2020 | Kim | G06F 16/2468 |
| 2020/0312007 A1* | 10/2020 | Liu | G06T 15/04 |
| 2020/0349369 A1* | 11/2020 | Liu | G06N 3/045 |
| 2020/0380338 A1* | 12/2020 | Matsumura | G06F 18/22 |
| 2020/0380366 A1* | 12/2020 | Wang | G06F 18/2431 |
| 2020/0394475 A1* | 12/2020 | Akhazhanov | G06N 3/084 |
| 2021/0042529 A1* | 2/2021 | Price | G06V 20/46 |
| 2021/0056675 A1* | 2/2021 | Higa | G06V 30/19147 |
| 2021/0089895 A1* | 3/2021 | Munoz Delgado | G06N 3/043 |
| 2021/0089903 A1* | 3/2021 | Murray | G06T 3/4046 |
| 2021/0158094 A1* | 5/2021 | Ji | G06V 10/764 |
| 2021/0158139 A1* | 5/2021 | Mai | G06T 15/506 |
| 2021/0358115 A1* | 11/2021 | Hever | G06T 7/0008 |
| 2022/0114393 A1* | 4/2022 | Keshwani | A61B 6/037 |
| 2022/0122348 A1* | 4/2022 | Pei | G06N 3/047 |
| 2022/0180190 A1* | 6/2022 | Verma | G06N 3/047 |
| 2022/0198609 A1* | 6/2022 | Carbune | G06T 5/60 |
| 2022/0318956 A1* | 10/2022 | Xu | G06T 5/50 |
| 2022/0335290 A1* | 10/2022 | Pisarenco | G06N 3/045 |
| 2022/0335333 A1* | 10/2022 | Cao | G06N 3/047 |
| 2022/0335689 A1* | 10/2022 | Zhu | G06N 3/047 |
| 2023/0014823 A1* | 1/2023 | Cheng | G06T 7/0004 |
| 2023/0031755 A1* | 2/2023 | Khoreva | G06T 7/11 |
| 2025/0054333 A1* | 2/2025 | Lee | G06T 11/00 |

FOREIGN PATENT DOCUMENTS

| | | |
|---|---|---|
| CN | 109102014 A | 12/2018 |
| CN | 109784401 A | 5/2019 |
| CN | 110310345 A | 10/2019 |
| CN | 110598504 A | 12/2019 |
| CN | 110705376 A | 1/2020 |
| CN | 110717579 A | 1/2020 |

OTHER PUBLICATIONS

Ke. Y.; Image Recognition Based on Deep Network ACGAN; Image and Multimedia Technology; Electronic Technology and Software Engineering, Issue 18; Sep. 27, 2018, consisting of 2 pages.

International Search Report and Written Opinion dated Oct. 29, 2020 for International Application No. PCT/CN2020/073965 filed Jan. 23, 2020, consisting of 9-pages.

Augustus Odena et al.; Conditional Image Synthesis with Auxiliary Classifier GANs, Arxiv; Jul. 20, 2017, consisting of 12-pages.

Jeff Donahue et al.; Adversarial feature learning; Arxiv; Apr. 3, 2017, consisting of 18-pages.

EPO Communication with Supplementary European Search Report dated Aug. 8, 2023 for Patent Application No. 20915805.4, consisting of 10-pages.

A. Ali-Gombe et al.; Few-shot Classifier GAN; 2018 International Joint Conference on Neural Networks (IJCNN); IEEE; Jul. 8, 2018, consisting of 8-pages.

K. Gray et al.; Coupled IGMM-GANs for improved generative adversarial anomaly detection; 2018 IEEE International Conference on Big Data (Big Data); Dec. 2018, consisting of 4-pages.

* cited by examiner

METHOD AND APPARATUS FOR IMAGE CLASSIFICATION

CROSS-REFERENCE TO RELATED APPLICATIONS

This application is a Submission Under 35 U.S.C. § 371 for U.S. National Stage Patent Application of International Application Number: PCT/CN2020/073965, filed Jan. 23, 2020 entitled "METHOD AND APPARATUS FOR IMAGE CLASSIFICATION," the entirety of which is incorporated herein by reference.

FIELD OF THE INVENTION

The present disclosure generally relates to image processing technology, and more specifically, to a method and an apparatus for image classification.

BACKGROUND

This section introduces aspects that may facilitate better understanding of the disclosure. Accordingly, the statements of this section are to be read in this light and are not to be understood as admissions about what is in the prior art or what is not in the prior art.

As the development of automatics of the industry, image processing technology is widely used to assistance an automatic operation for a product. For example, an image of the product may be obtained by a production line automatically, and then a current status (such as in a first status, or in a second status, etc.) of the product may be determined based on a result of processing the image. The next operation for the product may be made based on the current status of the product.

Generally, an operator or a user of the production line needs to pretraining an apparatus for image processing in the production line. Namely, the operator or the user needs to provide different standard rules (such as a standard image or a group of standard parameters) for each status of the product. Then, during the production procedure, an obtained image of a real product will be compared with such standard rules, so as to determine the current status of the real product.

Conventionally, a great number of images has to be captured and labelled as different status by human. Then, for each status of the product, different standard rules may be summarized based on images labelled with different status, either by human or machine.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

As mentioned above, one possible solution for image classification is to provide a model with different standard rules for each status of the product. However, it will be very hard to correctly classify some rarely shown abnormal status, since it is almost impossible to obtain a required number of sample images to generate standard rules for such abnormal status. Additionally, such procedure to generate such standard rules is not efficient, since it is very time consuming and human resources consuming for obtaining and labelling sample images.

According to various embodiments of the present disclosure, there is provided an improved solution to a method and an apparatus for image classification, which could overcome one or more problems as mentioned above.

According to the first aspect of the present disclosure, there is provided a method for image classification. The method may comprise: receiving an image to be classified; inputting the image to a discriminator of a first Generative Adversarial Network, GAN; and outputting a result indicating real and an index of a predetermined classification, or a result indicating fake.

In an embodiment of the present disclosure, the method may further comprise: determining that the image belongs to the predetermined classification due to the result indicating real and the index of the predetermined classification.

In an embodiment of the present disclosure, the method may further comprise: determining that the image corresponds to an abnormal status due to the result indicating fake.

In an embodiment of the present disclosure, the first GAN is an Auxiliary Classifier Generative Adversarial Network, ACGAN.

In an embodiment of the present disclosure, the method may further comprise: pretraining the first GAN using a plurality of sample images with classification information.

In an embodiment of the present disclosure, pretraining the first GAN using a plurality of sample images with classification information may comprise multiple epochs, wherein each epoch comprises: training the discriminator of the first GAN with the plurality of sample images with classification information and a plurality of noise images with classification information, while freezing a generator of the first GAN; and training the generator of the first GAN with random noise and random classification information, while freezing the discriminator of the first GAN, wherein the generator of the first GAN generates the plurality of noise images and the classification information for the plurality of noise images; wherein the discriminator and the generator of the first GAN are trained iteratively; and wherein a number of iterative times for the discriminator of the first GAN is larger than a number of iterative times for the generator of the first GAN.

In an embodiment of the present disclosure, the method may further comprise: generating classification information for the plurality of sample images by using a second GAN.

In an embodiment of the present disclosure, the second GAN may be a Bidirectional Generative Adversarial Network, BiGAN.

In an embodiment of the present disclosure, generating classification information for the plurality of sample images by using a second GAN comprises: collecting the plurality of sample images without classification information; generating a latent space vector for each of the plurality of sample images by an encoder of a second GAN; clustering the plurality of sample images to at least one cluster, based on the latent space vector for each of the plurality of sample images; and assigning a classification to each of the at least one cluster, respectively.

In an embodiment of the present disclosure, the plurality of sample images is clustered to at least one cluster, based on the latent space vector for each of the plurality of sample images, by using a Gaussian Mixed Model, GMM.

According to the second aspect of the present disclosure, there is provided an apparatus for image classification, comprising: a processor and a memory, said memory containing instructions executable by said processor whereby said apparatus for image classification is operative to: receive an image to be classified; input the image to a discriminator of a first Generative Adversarial Network, GAN; and output a result indicating real and an index of a predetermined classification, or a result indicating fake.

In an embodiment of the present disclosure, the apparatus may be further operative to: determine that the image belongs to the predetermined classification due to the result indicating real and the index of the predetermined classification.

In an embodiment of the present disclosure, the apparatus may be further operative to: determine that the image corresponds to an abnormal status due to the result indicating fake.

In an embodiment of the present disclosure, the first GAN is an Auxiliary Classifier Generative Adversarial Network, ACGAN.

In an embodiment of the present disclosure, the apparatus may be further operative to: pretrain the first GAN using a plurality of sample images with classification information.

In an embodiment of the present disclosure, said apparatus for image classification may be operative to pretrain the first GAN using a plurality of sample images with classification information with multiple epochs, wherein each epoch may comprise: training the discriminator of the first GAN with the plurality of sample images with classification information and a plurality of noise images with classification information, while freezing a generator of the first GAN; and training the generator of the first GAN with random noise and random classification information, while freezing the discriminator of the first GAN, wherein the generator of the first GAN generates the plurality of noise images and the classification information for the plurality of noise images; wherein the discriminator and the generator of the first GAN are trained iteratively; and wherein a number of iterative times for the discriminator of the first GAN is larger than a number of iterative times for the generator of the first GAN.

In an embodiment of the present disclosure, the apparatus may be further operative to: generate classification information for the plurality of sample images by using a second GAN.

In an embodiment of the present disclosure, the second GAN is a Bidirectional Generative Adversarial Network, BiGAN.

In an embodiment of the present disclosure, said apparatus for image classification may be operative to: collect the plurality of sample images without classification information; generate a latent space vector for each of the plurality of sample images by an encoder of a second GAN; cluster the plurality of sample images to at least one cluster, based on the latent space vector for each of the plurality of sample images; and assign a classification to each of the at least one cluster, respectively.

In an embodiment of the present disclosure, the plurality of sample images may be clustered to at least one cluster, based on the latent space vector for each of the plurality of sample images, by using a Gaussian Mixed Model, GMM.

According to the third aspect of the present disclosure, there is provided a computer-readable medium having instructions stored thereon which, when executed on at least one processor, cause the at least one processor to carry out any of the method above described.

According to various embodiments of the present disclosure, one or more advantages can be achieved, for example, an image (such as one image corresponding to abnormal status) not belong to any predetermined classification may also be determined, while it is not necessary to generate standard rules for such unclassified image.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
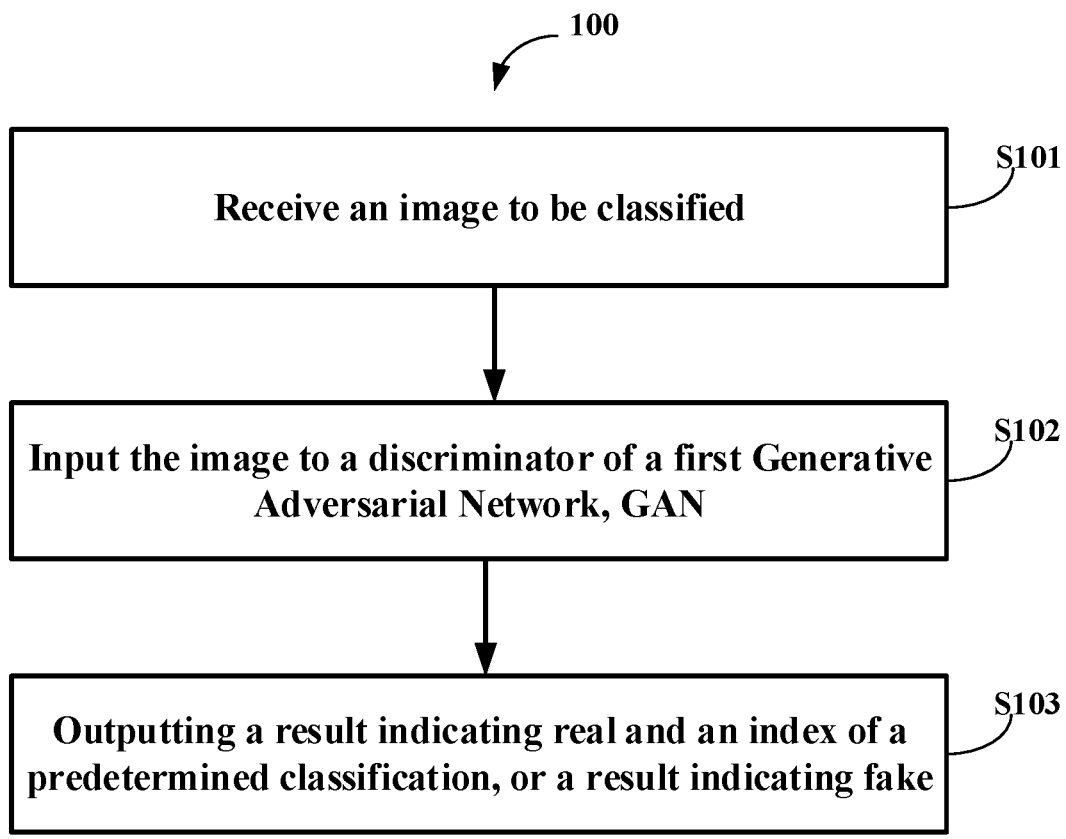
FIG. 1 illustrates a flowchart for a method for image classification according to embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitation on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

In the following, various embodiments of the present disclosure will be described with reference to the accompany figures.

Only as a specific example without limitation, an image for a bullet may be discussed below. The bullet is the connector to connect transceivers (TRX) board and filter in radio product, such as in a $5^{th}$ generation (5G) radio system. In 5G production line, robots are used to install the bullets in the product. Bullets are placed in a tray and robots will seize the bullet to the camera. Recognition process will be triggered to detect head or tail side and send the feedback signal to the robot to take appropriate action. In reality, abnormal situation may happen. For example, bullets may not be placed in right place of the tray, hence there is no bullet at all in the image/photo obtained by the camera. Bullets may not be in correct form/status, hence the image is not showing a normal bullet at all. Photo may be noise polluted, and blurring for the detection. In these abnormal scenarios, the bullet will be abandoned so that robot will take a new one to continue.

In above process, the system needs not only classify bullet head (i.e., a first class/status) and tail (i.e., a second class/status) categories, but also do anomaly detection when images are abnormal such as no object, misplacement, noise polluted, blurring, etc.

There may be some possible technologies to address these 2 tasks (anomaly detection and classification).

Solution 1: 2 models may be created separately for these 2 tasks. One is for anomaly detection while another is for classification.

Solution 2: 1 unsupervised learning model may be used to do anomaly detection and classification. More specifically, based on the activation function for classifier output to determine the category. i.e.

If the probability for class tail is over a threshold (e.g. 0.6), it is considered as class tail. If it is lower than threshold (e.g. 0.4), it is considered as class head. If it is lower than the previous threshold (e.g. 0.6) but higher than the other latter threshold (e.g. 0.4), it is considered as anomalous sample.

Solution 3: 1 supervised learning model is used to detect bullet head, bullet tail or anomaly. i.e. a lot of samples of each type is collected to train the model, then use this model to classify head, tail, anomaly.

However, in solution 1, using anomaly detection and classification models separately will slow down the recognition process. In solution 2, the classification probability for some anomalous samples, even greatly different from the normal samples, is still very high, even higher than 99%, so the accuracy for this method is quite poor. In solution 3, when using supervised learning model for image classification, it requires manual effort to label the training data. Doing such data labeling requires quite big effort and is time-consuming. When using supervised learning model for anomaly detection, it requires to collect a lot of anomalies as training data set but in the real world, it is very hard to collect so many anomalies since it is a rare event. Further, no matter which solution is applied, head or tail should be labeled. There're a lot of labeling effort.

FIG. 1 illustrates an exemplary flowchart for a method for image classification according to embodiments of the present disclosure.

As shown in FIG. 1, the method 100 may comprise: S101, receiving an image to be classified; S102, inputting the image to a discriminator of a first Generative Adversarial Network, GAN; and S103, outputting a result indicating real and an index of a predetermined classification, or a result indicating fake.

According to method as shown in FIG. 1, one or more advantages can be achieved, for example, the discriminator of the first GAN can output result either indicating real or fake in within one network/model instead of implementing 2 or more tasks/models separately. The detection time will be reduced, and there is no need to collect anomalous samples, which are much harder to get than the normal samples. The efficiency may be also improved.

It is also noted that an image for any industry product other than bullet in any production line may be applicable, according to embodiments of the present disclosure.

Figure 2:
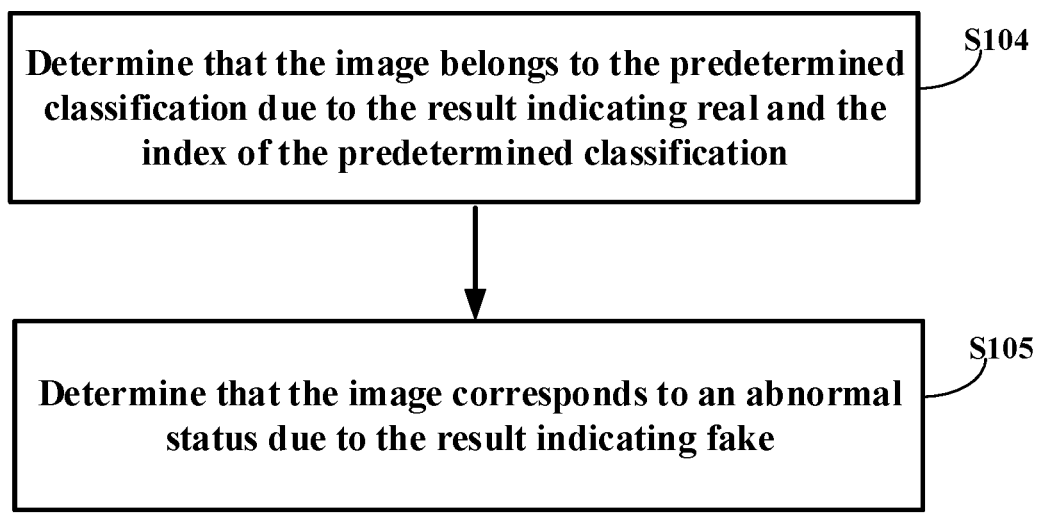
FIG. 2 illustrates an exemplary flowchart for additional steps of the method as shown in FIG. 1, according to embodiments of the present disclosure.

FIG. 2 illustrates an exemplary flowchart for additional steps of the method as shown in FIG. 1, according to embodiments of the present disclosure.

As shown in FIG. 2, the method 100 may further comprise: S104, determining that the image belongs to the predetermined classification due to the result indicating real and the index of the predetermined classification.

Additionally, the method 100 may further comprise: S105, determining that the image corresponds to an abnormal status due to the result indicating fake.

According to method as shown in FIG. 2, the classification of the image and/or whether the image is abnormal will be determined directly and clearly based on the output of the discriminator of the first GAN.

Figure 3:
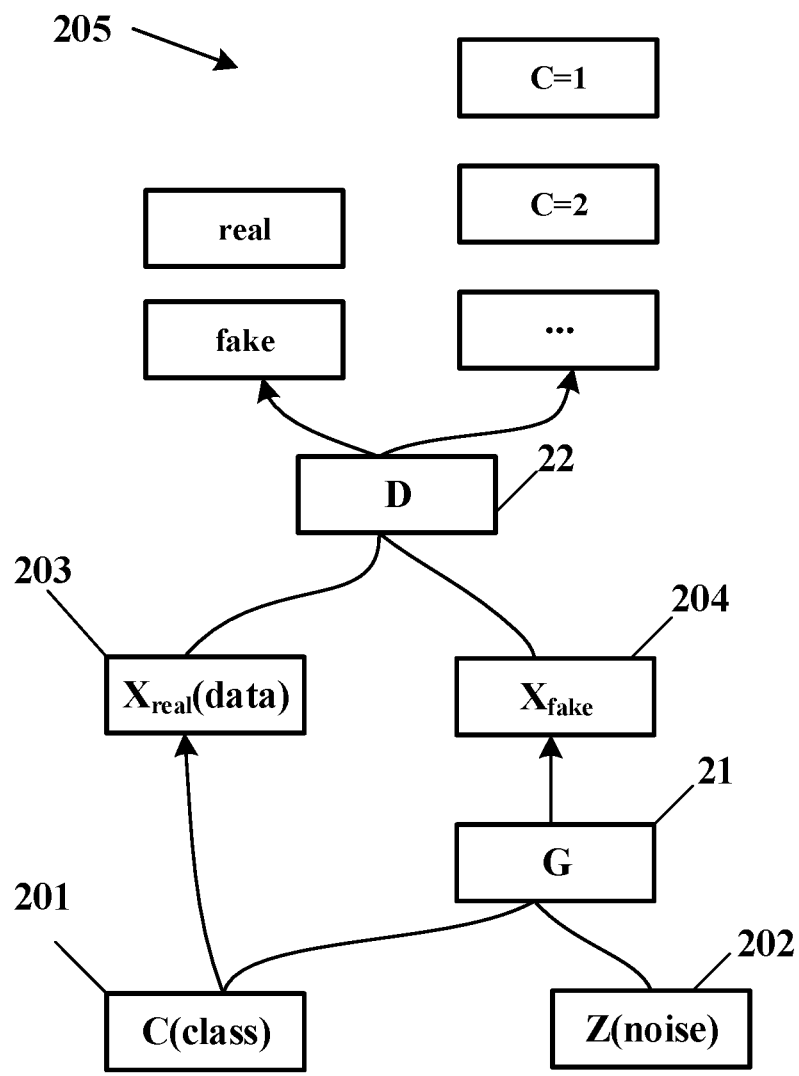
FIG. 3 illustrates an exemplary block diagram for the first Generative Adversarial Network, GAN according to embodiments of the present disclosure.

FIG. 3 illustrates an exemplary block diagram for the first Generative Adversarial Network, GAN according to embodiments of the present disclosure.

As shown in FIG. 3, the first GAN may be an Auxiliary Classifier Generative Adversarial Network, ACGAN.

The ACGAN may at least comprise: a generator, G, 21, and a discriminator, D, 22. The input to the generator 21 may comprise class information for the images, C (class), 201, and noise, Z (noise), 202. The input to the discriminator 22 may comprises: real data, $X_{real}$(data), 203 relating to real status, and fake data, $X_{fake}$, 204, generated from the generator 21. The output 205 of the discriminator 22 may include a result indicating real and an index of a predetermined classification, or a result indicating fake.

Figure 4:
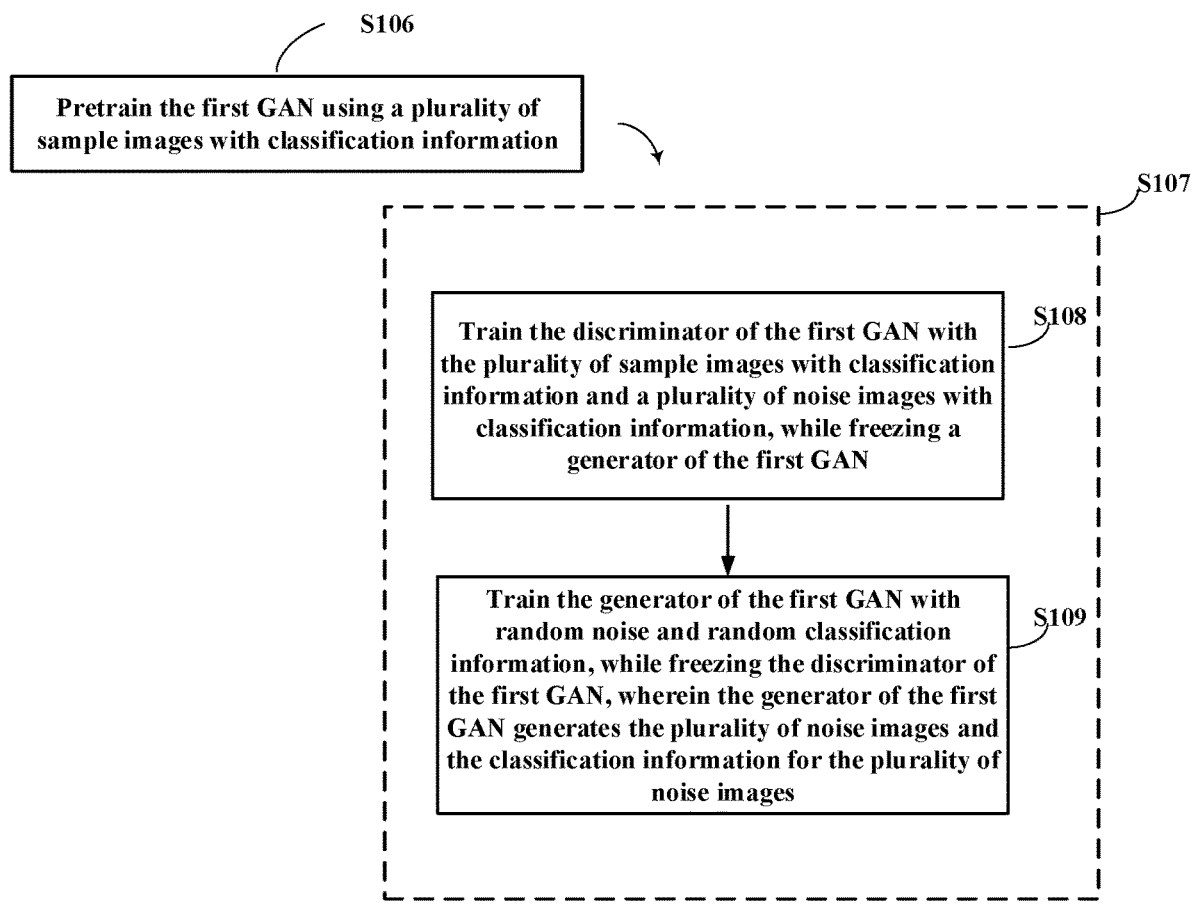
FIG. 4 illustrates an exemplary flowchart for other additional steps of the method as shown in FIG. 1, according to embodiments of the present disclosure.

FIG. 4 illustrates an exemplary flowchart for other additional steps of the method as shown in FIG. 1, according to embodiments of the present disclosure.

As shown in FIG. 4, the method 100 may further comprise: S106, pretraining the first GAN using a plurality of sample images with classification information.

Particularly, in an embodiment of the present disclosure, S106, pretraining the first GAN using a plurality of sample images with classification information may comprise multiple epochs S107, wherein each epoch S107 comprises: S108 training the discriminator of the first GAN with the plurality of sample images with classification information and a plurality of noise images with classification information, while freezing a generator of the first GAN; and S109 training the generator of the first GAN with random noise and random classification information, while freezing the discriminator of the first GAN. The generator of the first GAN generates the plurality of noise images and the classification information for the plurality of noise images. The discriminator and the generator of the first GAN are trained iteratively. Further, number of iterative times for the discriminator of the first GAN is larger than a number of iterative times for the generator of the first GAN.

That is, S108, and S109 are iterated for several epochs. Accordingly, discriminator (discriminative model) and generator (generative model) are trained alternatively.

According to embodiments of the present disclosure, the number of iterative times for training discriminator may be larger than that of the generator, so as to make the discriminator (which will be used for classifying the images) stronger. For example, a ratio of the iterative times for training discriminator and generator may be 10:1.

The generator of the first GAN may generate noise images directly, or adding the random noise to existing real images to obtain noise images. Random noise may comprise random noise vector including multiple dimensions (parameters) to change real characteristics of the existing real images. For example, random noise vector may include 100 dimensions. Further, the operator/user may also directly configure some abnormal images as part of noise images.

With such configuration, the discriminator and the generator of the first GAN may be automatically pretrained. The efficiency may be improved.

Figure 5:
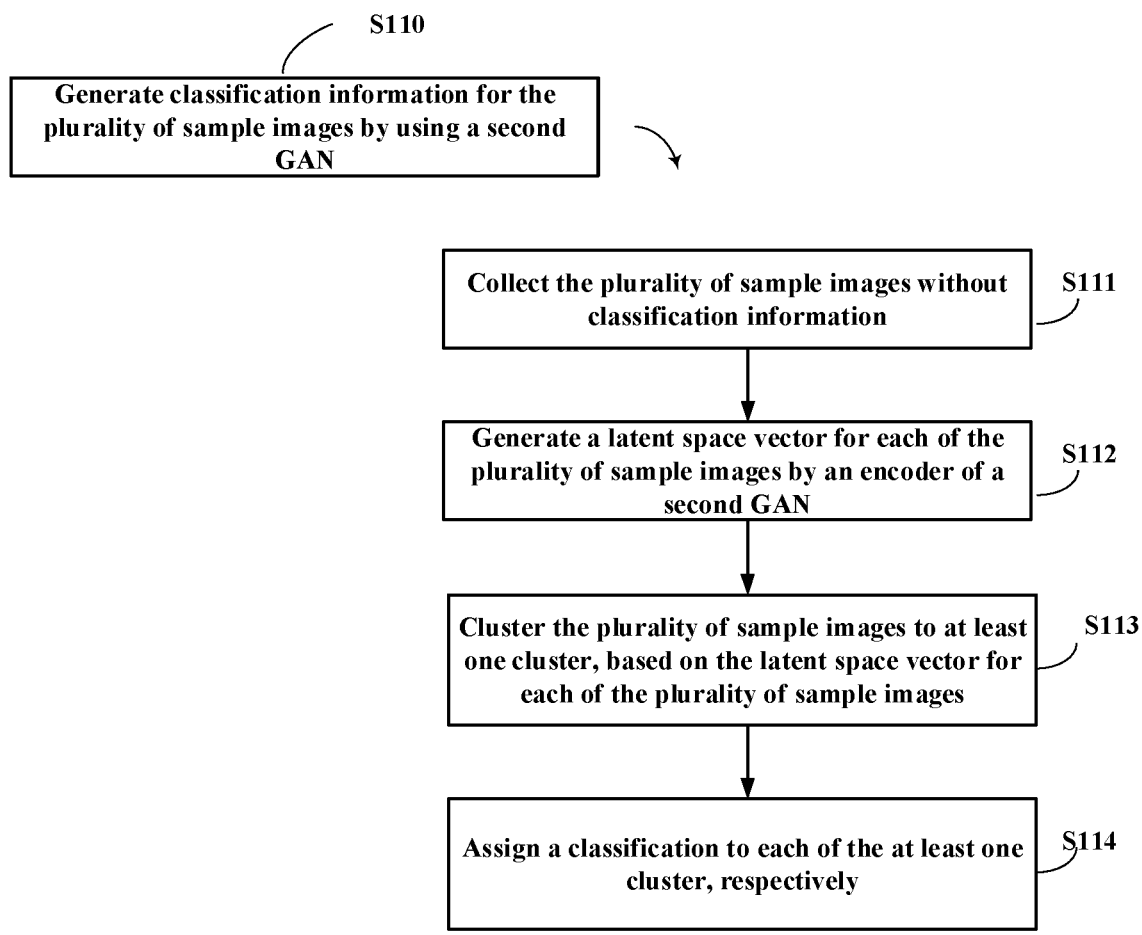
FIG. 5 illustrates an exemplary flowchart for other additional steps of the method as shown in FIG. 1, according to embodiments of the present disclosure.

FIG. 5 illustrates an exemplary flowchart for other additional steps of the method as shown in FIG. 1, according to embodiments of the present disclosure.

As shown in FIG. 5, the method 100 may further comprise: S110, generating classification information for the plurality of sample images by using a second GAN.

In an embodiment of the present disclosure, generating classification information for the plurality of sample images by using a second GAN may comprise: S111, collecting the plurality of sample images without classification information; S112, generating a latent space vector for each of the plurality of sample images by an encoder of a second GAN; S113, clustering the plurality of sample images to at least one cluster, based on the latent space vector for each of the plurality of sample images; and S114, assigning a classification to each of the at least one cluster, respectively.

In embodiments of the present disclosure, the second GAN may be a Bidirectional Generative Adversarial Network, BiGAN. Further, in an embodiment of the present disclosure, the plurality of sample images is clustered to at least one cluster, based on the latent space vector for each of the plurality of sample images, by using a Gaussian Mixed Model, GMM. That is, a combination of BiGAN+GMM may be utilized.

It is noted that, any other kind of GAN may also be used as long as it can produce latent space vector for each of the plurality of sample images. Further, any other kind of model may be also be used as long as it can cluster the plurality of sample images based on latent space vector.

According to embodiments of the present disclosure, there is no need to do a lot manual labeling for the sample images. And there is no need to do hand-crafted features for different classification of the samples.

The image for a bullet may be taken as example again to further illustrate embodiments of the present disclosure.

Figure 6:
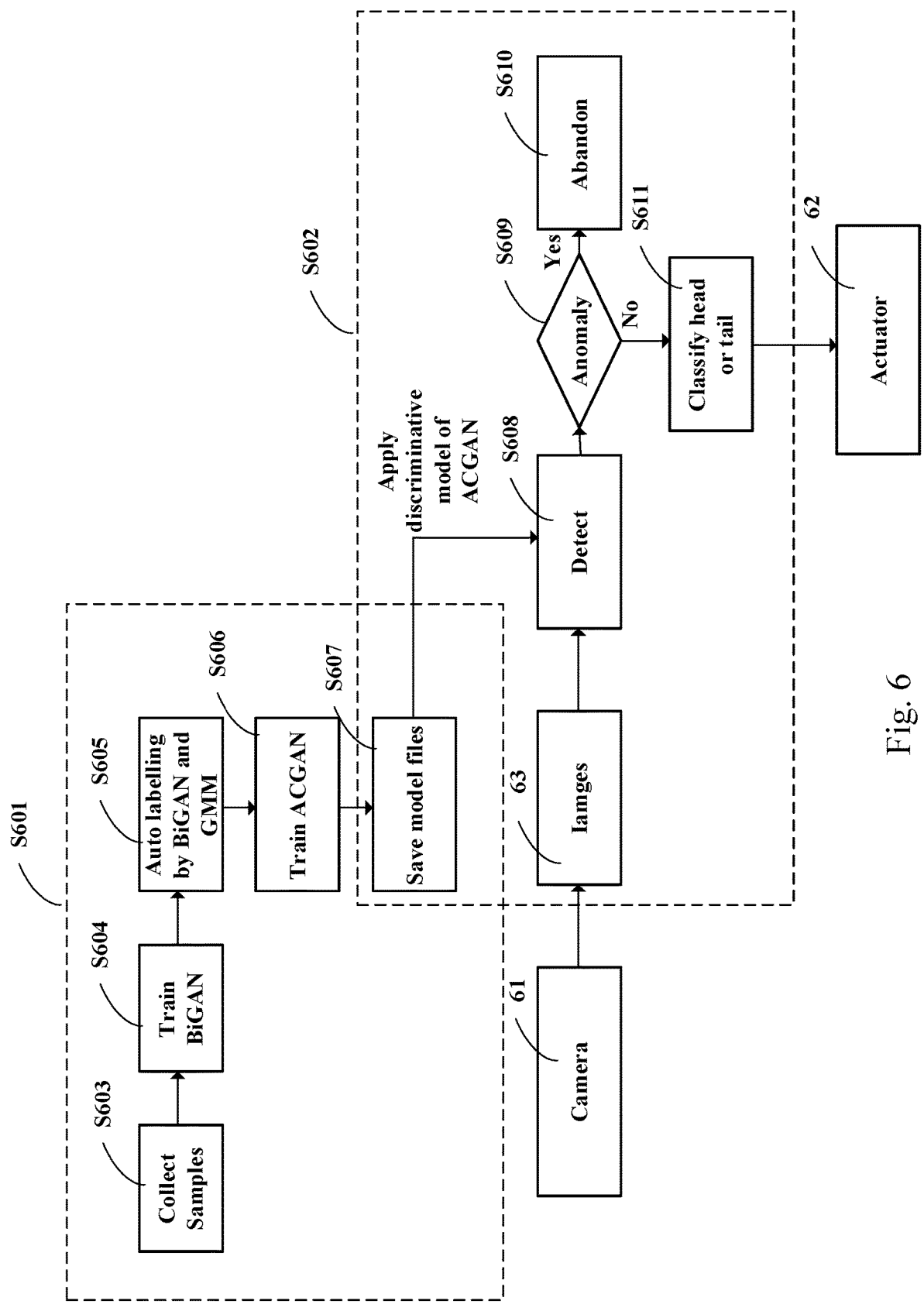
FIG. 6 illustrate a flow chart for training phase and detection phase in an application for a production/product line, according to embodiments of the present disclosure.

FIG. 6 illustrate a flow chart for training phase and detection phase in an application for a production/product line, according to embodiments of the present disclosure.

In training phase S601, BiGAN and ACGAN both are trained.

In S603, samples (sample images) may be collected as training data by the camera 61 mounted on the product line.

In S604, a BiGAN model is built and trained to encode the images.

In S605, GMM model is built to classify the image for auto labeling. With this method, there is no need to label as head or tail.

In S606, the ACGAN is built and trained to detect the bullet head, tail or anomaly.

In S607, the trained models are stored as files so that it will be loaded and executed in Detection phase.

In S608 of the detection phase S602, the discriminative model of the ACGAN is applied, namely, each image 63 taken by camera 21 will be detected by the discriminator of ACGAN.

In S609, if the probability (outputted from the ACGAN) for the image 63 being a real image is lower than a threshold, it is considered as anomalous sample and it should be abandoned in S610.

For the normal sample, if the probability for the image 63 being head class is larger than tail, it will be classified as head class, otherwise, it will be classified as tail class in S611. The classification being head or tail will be outputted to an actuator 62 (such as a robot arm) in the product line.

Figure 7:
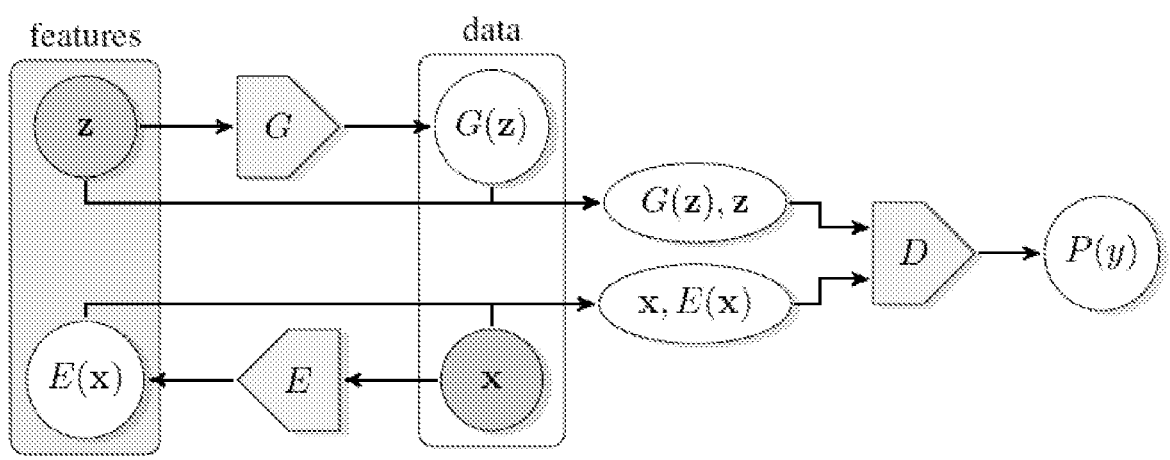
FIG. 7 illustrates an exemplary framework of BiGAN, according to embodiments of the present disclosure.

FIG. 7 illustrates an exemplary framework of BiGAN, according to embodiments of the present disclosure.

The overall model is depicted in FIG. 7. In addition to the generator G from the standard GAN framework, BiGAN includes an encoder E which maps data x to latent representation z. The BiGAN discriminator D discriminates not only in data space (x versus G(z)), but jointly in data and latent space (tuples (x, E(x)) versus (G(z), z), where the latent component is either an encoder output E(x) or a generator input z. P(y) means the possibility of the tuple comes from (x, E(x)).

The key point in this disclosure is to utilize encoder E(x) to get the latent space of the image.

First, the object function may be described as below:

$$\min_{G,E} \max_{D} V(D, E, G)$$

where $$V(D, E, G) :=$$

$$\mathbb{E}_{x \sim px}[\underbrace{\mathbb{E}_{z \sim p_E(\cdot|x)}[\log D(x, z)]}_{\log D(x, E(x))}] + \mathbb{E}_{z \sim pz}[\underbrace{\mathbb{E}_{x \sim p_G(\cdot|z)}[\log(1 - D(x, z))]}_{\log(1 - D(G(z), z))}].$$

As an example without limitation, functions in J. Donahue, P. Krähenbühl, and T. Darrell, "Adversarial feature learning," arXiv preprint arXiv:1605.09782, 2016, may be utilized.

In the above function, D, E, G represent discriminator, encoder, generator respectively. x~px represents the distribution from real data. $\mathbb{E}_{x \sim px}$ means the expectation of log D(x,E(x)).

$$\underbrace{[\mathbb{E}_{z \sim pz(\cdot|x)}[\log D(x, z)]]}_{\log D(x, E(x))}$$

means the log possibility of the tuple coining from (x, E(x)). $\mathbb{E}_{z \sim pz}$ means the expectation of log(1–D(G(z),z)).

$$\underbrace{[\mathbb{E}_{x \sim p_G(\cdot|z)}[\log(1 - D(x, z))]]}_{\log(1 - D(G(z), z))}$$

means the log possibility of the tuple coining from (G(z), z)

Figure 8:
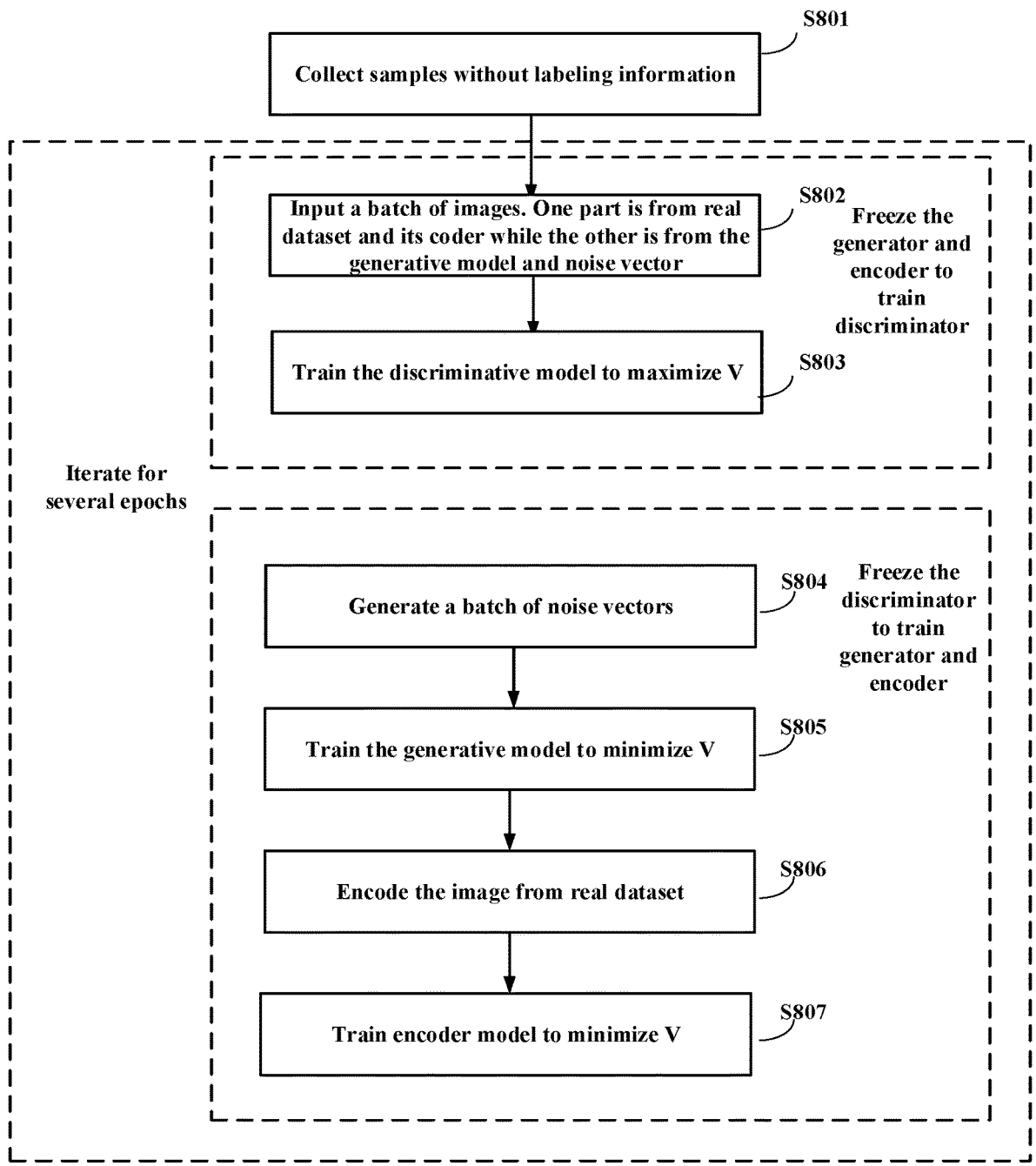
FIG. 8 illustrates an exemplary flow chart to train the BiGAN model, according to embodiments of the present disclosure.

FIG. 8 illustrates an exemplary flow chart to train the BiGAN model, according to embodiments of the present disclosure.

Generative and encoder model is trained to minimize V while discriminative model is trained to maximize V. The training process may be described as below:

Step S801: Collect samples. No need to label manually

Step S802-S803: Freeze the generative and encoder model, only to train discriminative model.

The input to the discriminative model is composed of 2 parts: the bullet images from the real dataset (Real class) and its code (Get from the encoder); and the bullet images generated by the generative model (Fake class) and corresponding random noise vectors. The output is whether it is real or fake. The discriminative model is trained to maximize object function V.

Step S804-S807: Freeze the discriminative model, only to train generative and encoder model.

In S804: Generate a batch of noise vectors (e.g. 2 dimensions) with uniform distribution.

In S805: Train the generative model to minimize V.

In S806: Encode the image from real dataset.

In S807: Train encoder model to minimize V.

Steps S802-S803 and steps S804-S807 are iterated for several epochs. It means discriminative model and generative, encoder model are trained alternatively.

Figure 9:
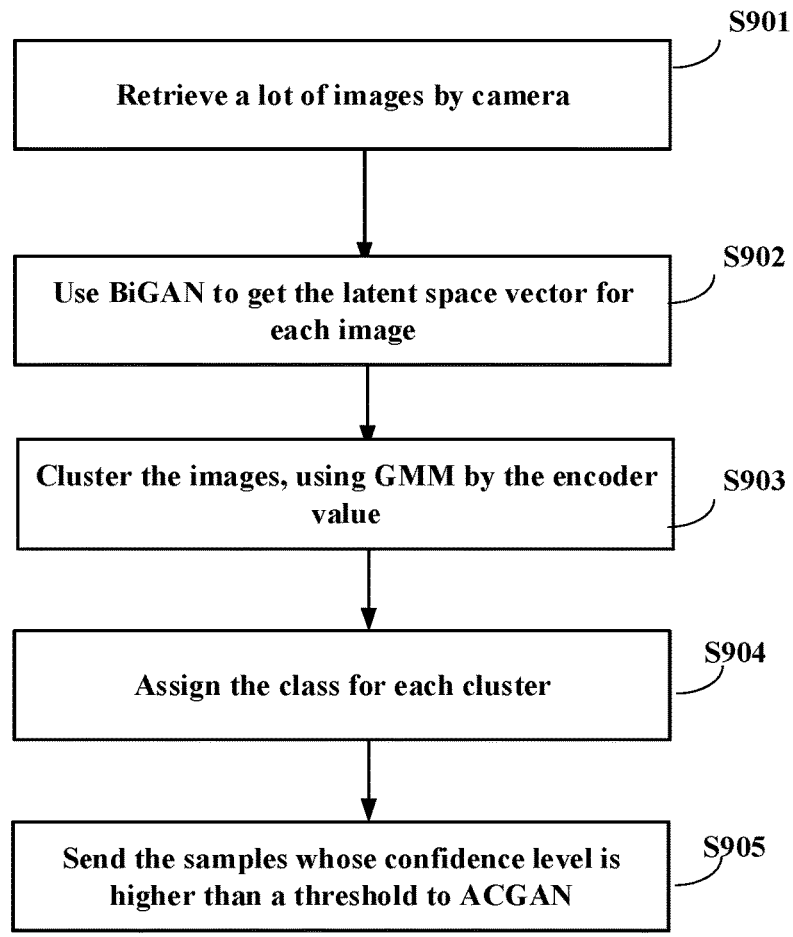
FIG. 9 illustrates an exemplary flow chart to auto-labeling process, according to embodiments of the present disclosure.

FIG. 9 illustrates an exemplary flow chart to auto-labeling process, according to embodiments of the present disclosure.

In S901: Retrieve a lot of bullet images from the camera.

In S902: Use the encoder of the BiGAN to get the latent space vector for each image.

In S903: Clustering use GMM by the encoder value.

In S904: Assign the class for each cluster.

In S905: Send the samples whose confidence level is higher to a threshold to ACGAN.

Figure 10:
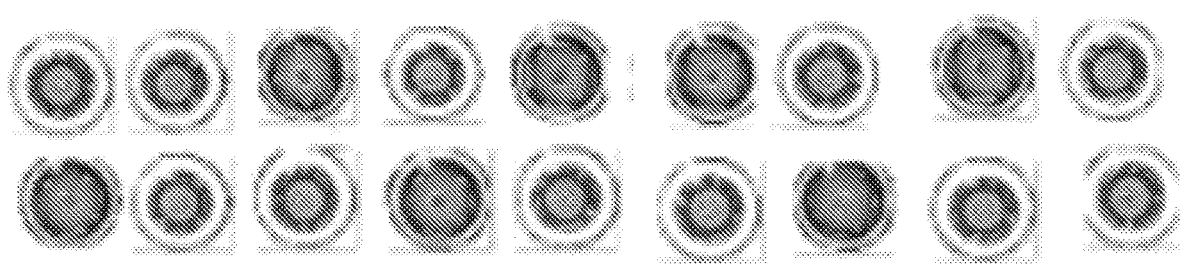
FIG. 10 illustrates a plurality of sample images for the bullet.
Figure 11:
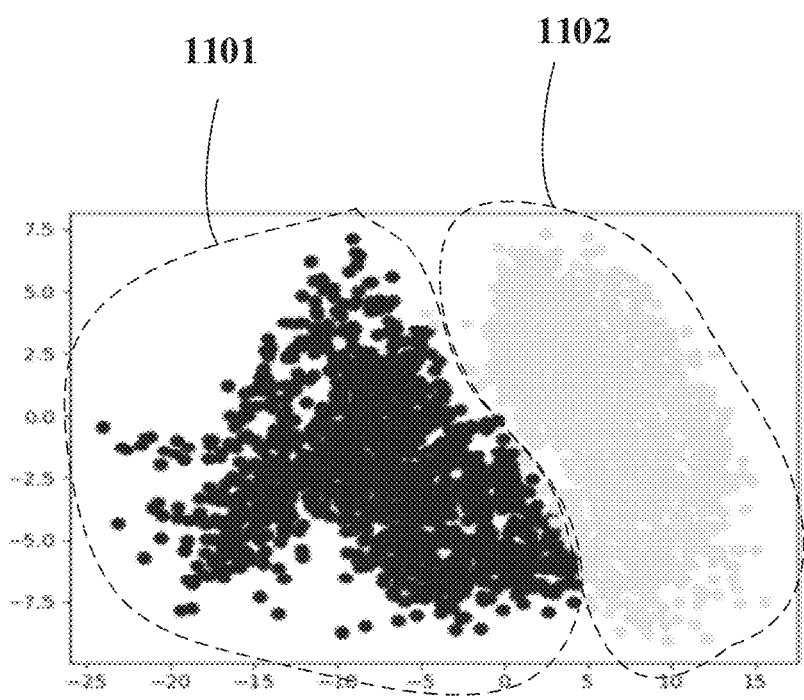
FIG. 11 shows a clustering result of the plurality of sample images in FIG. 10.
Figure 12:
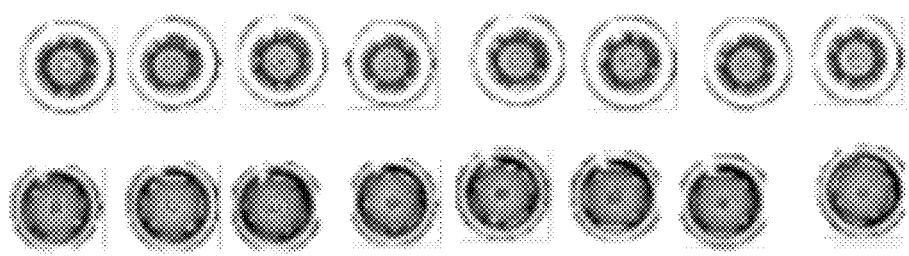
FIG. 12 shows the classification of the plurality of sample images.

FIG. 10 illustrates a plurality of sample images for the bullet. FIG. 11 shows a clustering result of the plurality of sample images in FIG. 10. FIG. 12 shows the classification of the plurality of sample images.

As shown in FIG. 10, these sample images are obtained without any regular pattern. As shown in FIG. 11, two clusters 1101, 1102 are obtained for these sample images. As shown in FIG. 12, the upper row shows sample images of a first class, such as head, and the lower row show sample images of a second class, such as tail.

Figure 13:
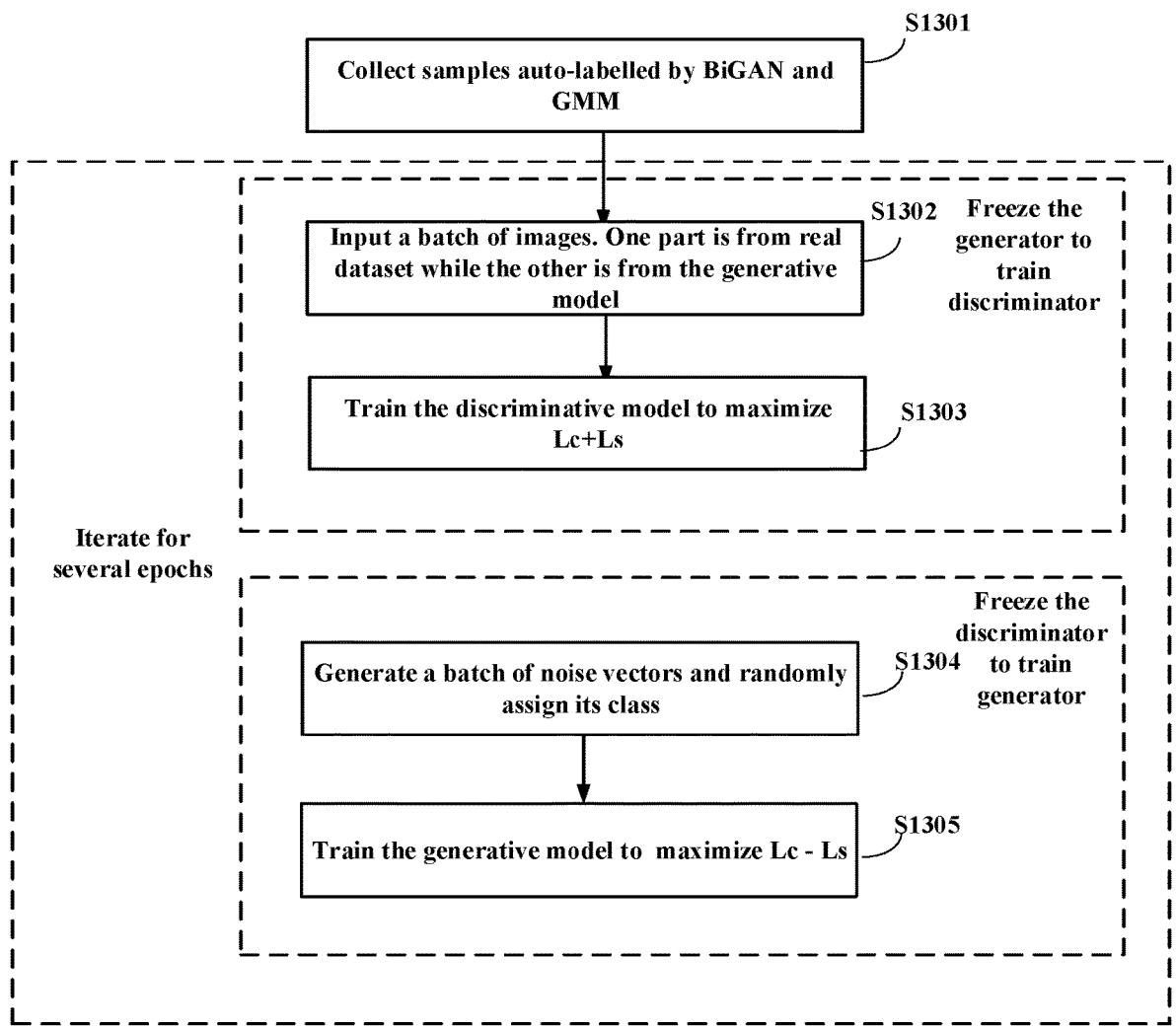
FIG. 13 illustrates an exemplary flow chart to train the ACGAN model, according to embodiments of the present disclosure.

FIG. 13 illustrates an exemplary flow chart to train the ACGAN model, according to embodiments of the present disclosure.

The overall model is depicted in FIG. 13. For the generator, the input is the random point from the latent space and the class label while the output is the generated image. For the discriminator, the input is the image while the output is the possibility of the real and the probability of the image belonging to each known class.

First, the object functions are described as below. The object functions have 2 parts: the log-likelihood of the correct source Ls and the log-likelihood of correct class Lc.

$$L_S = E[\log P(S=\text{real}|X_{real})] + E[\log P(S=\text{fake}|X_{fake})]$$

$$L_C = E[\log P(C=c|X_{real})] + E[\log P(C=c|X_{fake})]$$

As an example without limitation, functions in A. Odena, C. Olah, and J. Shlens, "Conditional image synthesis with auxiliary classifier GANs," 2016, arXiv:1610.09585 may be utilized.

In the above functions, means the expectation of the function depicted in [ ]. log $P(S=\text{real}|X_{real})$ means the log possibility of the image coining from the real image. log $P(S=\text{fake}|X_{fake})$ means the log possibility of the image coining from the generator. log $P(C=c|X_{real})$ means the log possibility of the class information coining from the real image. log $P(C=c|X_{fake})$ means the class information coining from the generated image.

Generative model is trained to maximize Lc−Ls while discriminative model is trained to maximize Lc+Ls. The training process is described as below:

Step S1301: Collect samples and automatically label as head or tail class (by BiGAN and GMM). No need to collect anomalous samples.

Steps S1302-S1303: Freeze the generative model, only to train discriminative model.

The input to the discriminative model is composed of 2 parts: the bullet images from the real dataset (Real class); and the bullet images generated by the generative model (Fake class). The output is its corresponding label and real or fake information. Train the discriminative model to maximize object function Lc+Ls.

Steps S1304-S1305: Freeze the discriminative model, only to train generative model.

In step S1034: Generate a batch of noise vectors (eg. 100 dimensions) with uniform distribution. Assign class for head or tail randomly for these vectors.

In step S1035: Train the generative model to maximize object function Lc−Ls.

Steps S1302-S1303 and Steps S1304-S1305 are iterated for several epochs. It means discriminative model and generative model are trained alternatively. Particularly, in order to make discriminator stronger, the iterative times for training discriminator is configured larger than the generator.

Figure 14:
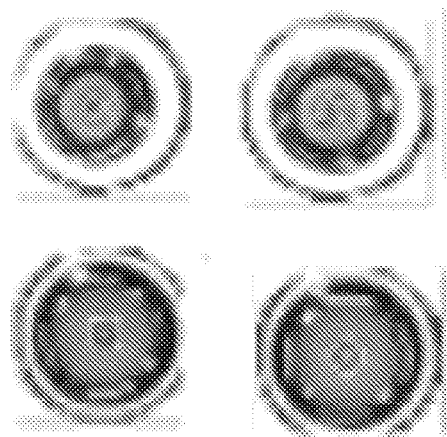
FIG. 14 illustrates a plurality of real labelled sample images for the bullet.
Figure 15:
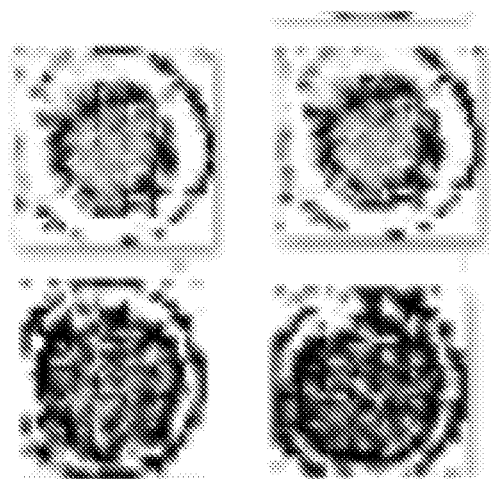
FIG. 15 illustrates a plurality of fake labelled sample images for the bullet.
Figure 16:
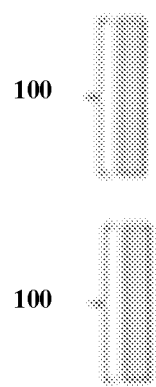
FIG. 16 illustrates random vectors assigned with class.

FIG. 14 illustrates a plurality of real labelled sample images for the bullet. FIG. 15 illustrates a plurality of fake labelled sample images for the bullet. FIG. 16 illustrates random vectors assigned with class.

As shown in FIG. 14, the upper row shows real sample images labelled to head of bullet, and the lower row shows real sample images labelled to tail of bullet. As shown in FIG. 15, the upper row shows fake/noise images labelled to head of bullet, and the lower row shows fake/noise images labelled to tail of bullet. The fake/noise images may be generated by adding noise to existing real samples. As shown in FIG. 16, the upper vector is assigned with class of head, and the lower vector is assigned with class of tail. The vector may have a dimension of 100.

Figure 17:
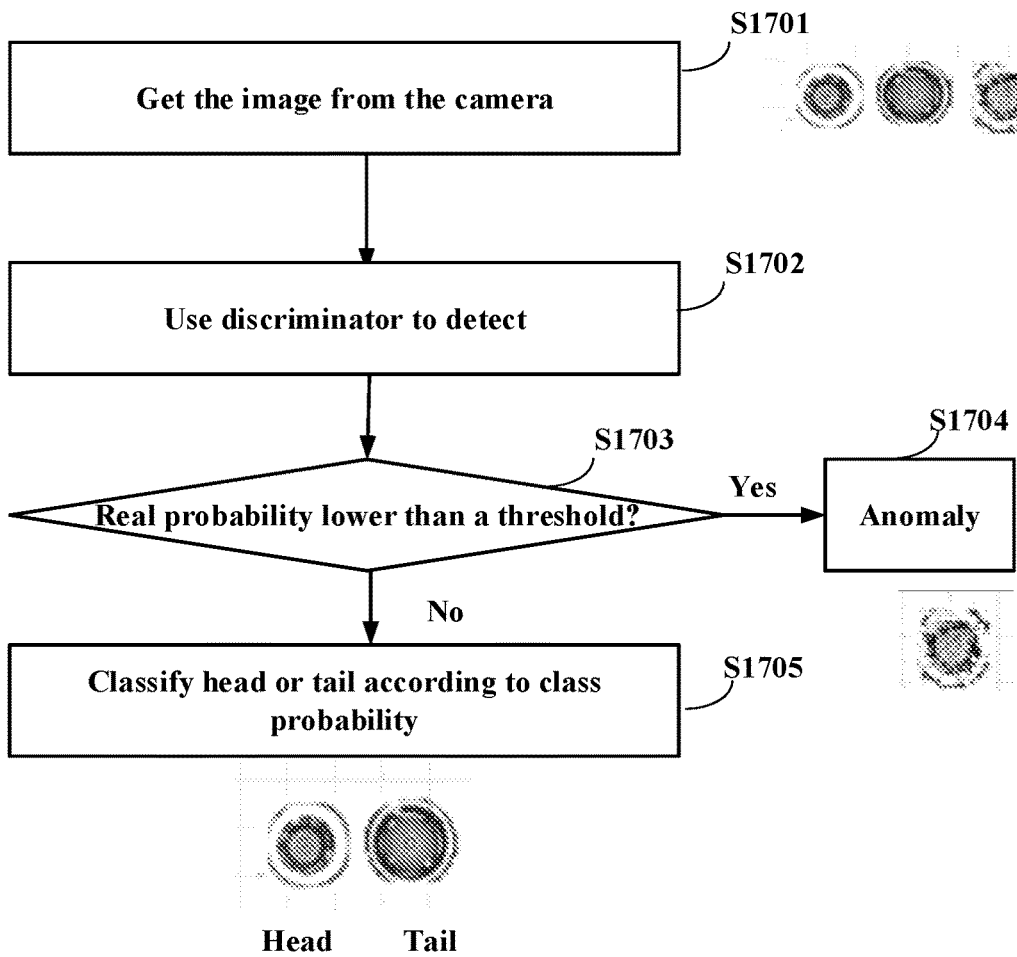
FIG. 17 illustrates an exemplary flow chart for the detection process, according to embodiments of the present disclosure.

FIG. 17 illustrates an exemplary flow chart for the detection process, according to embodiments of the present disclosure.

Three typic samples (head, tail, anomaly) are illustrated in the FIG. 17. As shown in FIG. 17, when a bullet image is coining in S1701, discriminative model is utilized to detect this image in S1702. The output has 2 parts: the probability of real image, and the probability of each category (head and tail). If the probability of real image is lower than a threshold in S1703, this bullet should be considered as anomaly in S1704 and abandoned. Otherwise it is classified as head or tail according to the probability of these 2 categories in S1705.

More examples of image result/output of some steps above described will be further shown below.

Figure 18:
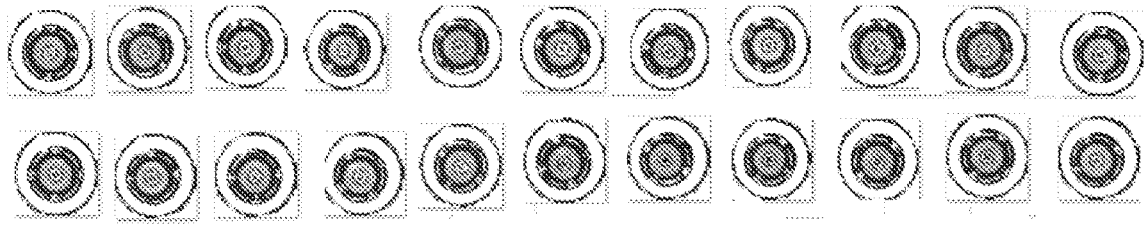
FIG. 18 illustrates bullet samples labelled by BiGAN and GMM, according to embodiments of the present disclosure.
Figure 18:
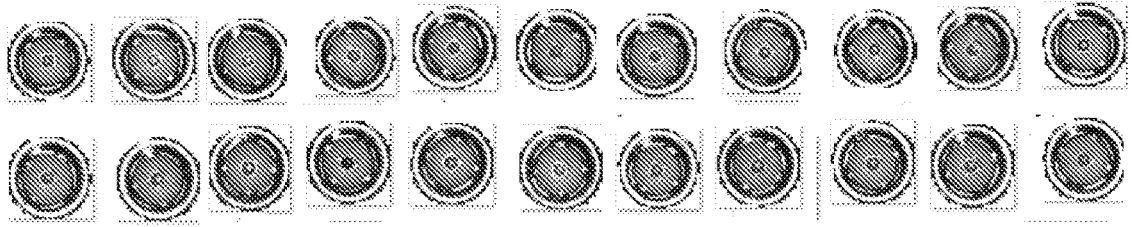

FIG. 18 illustrates bullet samples labelled by BiGAN and GMM, according to embodiments of the present disclosure.

Bullet samples are collected and BiGAN encoder and GMM are used to implement clustering. Each cluster are labelled as head or tail. The samples whose confidence level is higher than a threshold, as shown in FIG. 18, will be sent to ACGAN to train.

Figure 19:
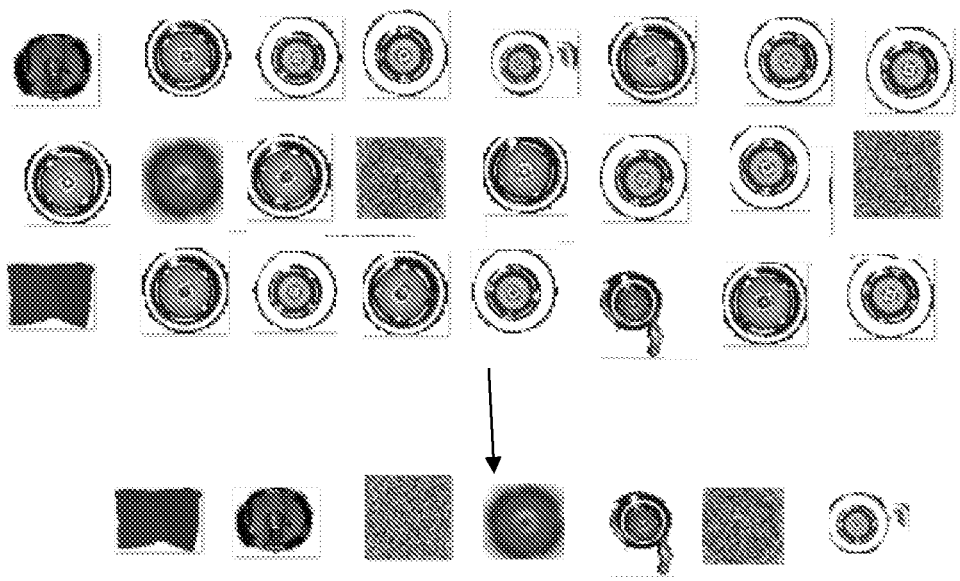
FIG. 19 illustrates anomaly detection result of ACGAN, according to embodiments of the present disclosure.

The upper two rows of samples are classed as head. The lower two rows of samples are classed as tail FIG. 19 illustrates anomaly detection result of ACGAN, according to embodiments of the present disclosure.

After finishing ACGAN training, the images taken by the camera are inputted to ACGAN. As shown in FIG. 19, discriminative model is utilized to realize anomaly detection, and thus anomaly samples (the lower group) are selected from all captured samples (the upper group). Other samples are considered as normal.

Figure 20:
FIG. 20 illustrates classification result of ACGAN for normal samples, according to embodiments of the present disclosure.
Figure 20:
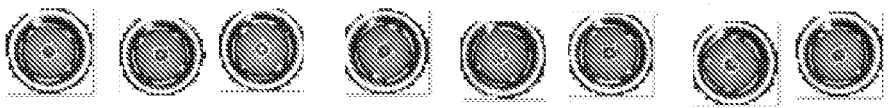

FIG. 20 illustrates classification result of ACGAN for normal samples, according to embodiments of the present disclosure.

As shown in FIG. 20, for the normal sample, they are classified as head or tail. The upper row is class head, and the lower row is class tail.

Such implementing classification and anomaly detection simultaneously has wide usage. Two use cases may be further cited as below:

Use case 1: Optical character recognition (OCR). Each character should be recognized by pattern recognition algorithm. Sometimes, the character which is not in the dataset is met. In this case, the algorithm should give feedback to machine learning engineer to label this specific character.

Use case 2: Putty recognition. Putty works as heatsink in in heat-generating components. In this scenario, putty shape needs to be classified into different categories such as square, circle, strip. Occasionally, abnormal shape is produced due to equipment failure. It means that not only specific shape needs to be classified, but also alarm needs to be raised when anomalous sample happens.

Figure 21:
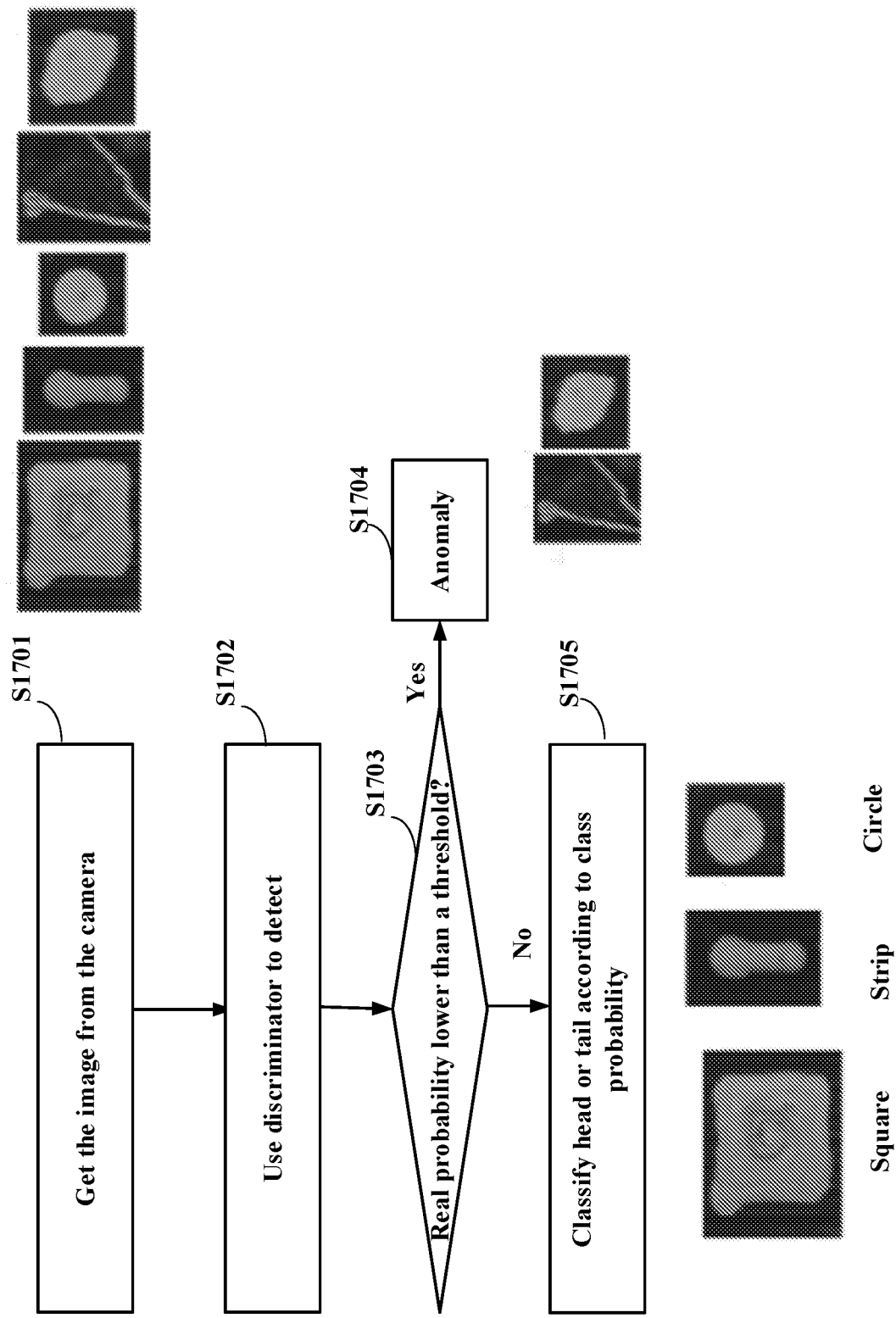
FIG. 21 illustrates an exemplary flow chart for the detection process of use case 2, according to embodiments of the present disclosure.

FIG. 21 illustrates an exemplary flow chart for the detection process of use case 2, according to embodiments of the present disclosure.

As shown in FIG. 21, abnormal putty shapes are selected in S1704, and normal putty shapes are further classified in S1705.

According to embodiments of the present disclosure, using ACGAN to implement anomaly detection and classification within a network can reduce the processing time and need not collect anomalous samples.

Figure 22:
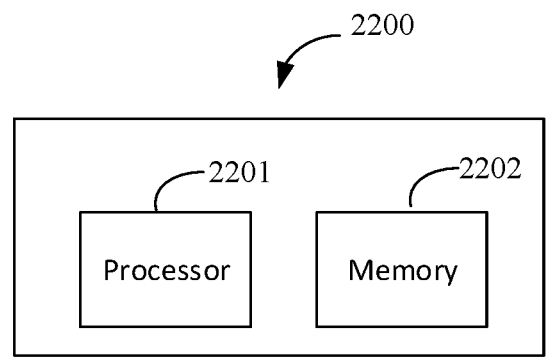
FIG. 22 illustrates an exemplary block diagram for an apparatus 2200 for image classification, according to embodiments of the present disclosure.

FIG. 22 illustrates an exemplary block diagram for an apparatus 2200 for image classification, according to embodiments of the present disclosure.

As shown in FIG. 22, the apparatus 2200 may comprise: a processor 2201 and a memory 2202, said memory containing instructions executable by said processor whereby said apparatus for image classification is operative to: receive an image to be classified; input the image to a discriminator of a first Generative Adversarial Network, GAN; and output a result indicating real and an index of a predetermined classification, or a result indicating fake.

In an embodiment of the present disclosure, the apparatus may be further operative to: determine that the image belongs to the predetermined classification due to the result indicating real and the index of the predetermined classification.

In an embodiment of the present disclosure, the apparatus may be further operative to: determine that the image corresponds to an abnormal status due to the result indicating fake.

In an embodiment of the present disclosure, the first GAN is an Auxiliary Classifier Generative Adversarial Network, ACGAN.

In an embodiment of the present disclosure, the apparatus may be further operative to: pretrain the first GAN using a plurality of sample images with classification information.

In an embodiment of the present disclosure, said apparatus for image classification may be operative to pretrain the first GAN using a plurality of sample images with classification information with multiple epochs, wherein each epoch may comprise: training the discriminator of the first GAN with the plurality of sample images with classification information and a plurality of noise images with classification information, while freezing a generator of the first GAN; and training the generator of the first GAN with random noise and random classification information, while freezing the discriminator of the first GAN, wherein the generator of the first GAN generates the plurality of noise images and the classification information for the plurality of noise images; wherein the discriminator and the generator of the first GAN are trained iteratively; and wherein a number of iterative times for the discriminator of the first GAN is larger than a number of iterative times for the generator of the first GAN.

In an embodiment of the present disclosure, the apparatus may be further operative to: generate classification information for the plurality of sample images by using a second GAN.

In an embodiment of the present disclosure, the second GAN is a Bidirectional Generative Adversarial Network, BiGAN.

In an embodiment of the present disclosure, said apparatus for image classification may be operative to: collect the plurality of sample images without classification information; generate a latent space vector for each of the plurality of sample images by an encoder of a second GAN; cluster the plurality of sample images to at least one cluster, based on the latent space vector for each of the plurality of sample images; and assign a classification to each of the at least one cluster, respectively.

In an embodiment of the present disclosure, the plurality of sample images may be clustered to at least one cluster, based on the latent space vector for each of the plurality of sample images, by using a Gaussian Mixed Model, GMM.

The processors 2201 may be any kind of processing component, such as one or more microprocessor or microcontrollers, as well as other digital hardware, which may include digital signal processors (DSPs), special-purpose digital logic, and the like. The memory 2202 may be any kind of storage component, such as read-only memory (ROM), random-access memory, cache memory, flash memory devices, optical storage devices, etc.

Figure 23:
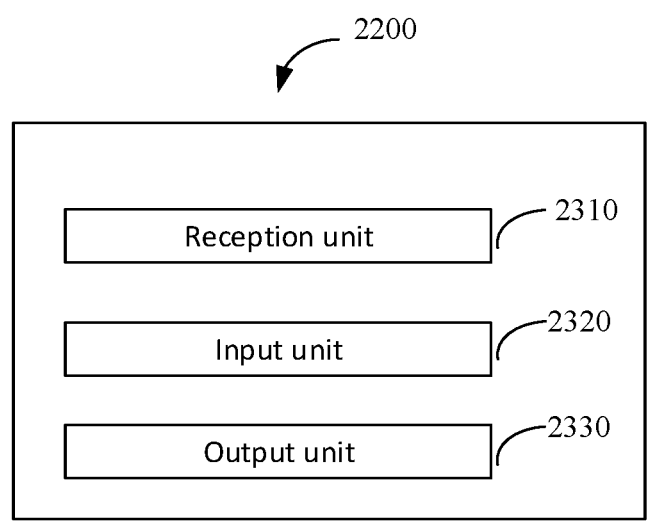
FIG. 23 illustrates another exemplary block diagram for an apparatus 2200 for image classification, according to embodiments of the present disclosure.

FIG. 23 illustrates another exemplary block diagram for an apparatus 2200 for image classification, according to embodiments of the present disclosure.

As shown in FIG. 23, the apparatus 2200 may comprise: a reception unit 2310, configured to receive an image to be classified; an input unit 2320, configured to input the image to a discriminator of a first Generative Adversarial Network, GAN; and an output unit 2330, configured to output a result indicating real and an index of a predetermined classification, or a result indicating fake.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the apparatus for image classification may not need a fixed processor or memory, any computing resource and storage resource may be arranged from at least one network node/device/entity/apparatus in the communication system. The virtualization technology and network computing technology may be further introduced, so as to improve the usage efficiency of the resources and the flexibility.

Figure 24:
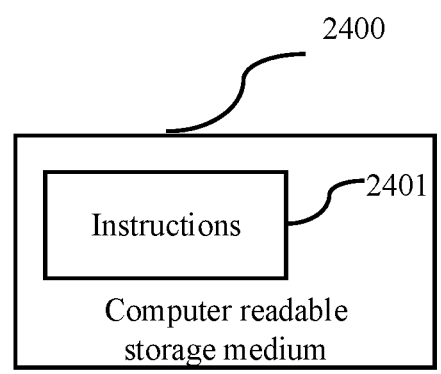
FIG. 24 illustrates exemplary block diagram for a computer-readable medium 2400, according to embodiments of the present disclosure.

FIG. 24 illustrates exemplary block diagram for a computer-readable medium 2400, according to embodiments of the present disclosure.

As shown in FIG. 24, the computer-readable medium 2400 may have instructions (i.e. software, programs, etc.) stored thereon which, when executed on at least one processor, cause the at least one processor to carry out any of the method above described.

The computer readable storage medium 2400 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

According to various embodiments of the present disclosure, one or more advantages can be achieved, for example, an image (such as one image corresponding to abnormal status) not belong to any predetermined classification may also be determined, while it is not necessary to generate standard rules for such unclassified image.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable/readable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method for image classification, the method comprising:
   pretraining a first Generative Adversarial Network, GAN, using a plurality of sample images with classification information, the pretraining comprising multiple epochs, each epoch comprising:
      training a discriminator of the first GAN with the plurality of sample images with classification information and a plurality of noise images with classification information, while freezing a generator of the first GAN; and
      training the generator of the first GAN with random noise and random classification information, while freezing the discriminator of the first GAN, the generator of the first GAN generating the plurality of noise images and the classification information for the plurality of noise images;
   the discriminator and the generator of the first GAN being trained iteratively;
   a number of iterative times for the discriminator of the first GAN being larger than a number of iterative times for the generator of the first GAN;
   receiving an image to be classified;
   inputting the image to the discriminator of the first GAN; and
   outputting a result indicating real and an index of a predetermined classification, or a result indicating fake.

2. The method according to claim 1, further comprising:
   determining that the image belongs to the predetermined classification due to the result indicating real and the index of the predetermined classification.

3. The method according to claim 1, further comprising:
   determining that the image corresponds to an abnormal status due to the result indicating fake.

4. The method according to claim 1,
   wherein the first GAN is an Auxiliary Classifier Generative Adversarial Network, ACGAN.

5. The method according to claim 1, further comprising:
   generating classification information for the plurality of sample images by using a second GAN.

6. The method according to claim 5, wherein the second GAN is a Bidirectional Generative Adversarial Network, BiGAN.

7. The method according to claim 5, wherein generating classification information for the plurality of sample images by using a second GAN comprises:
   collecting the plurality of sample images without classification information;
   generating a latent space vector for each of the plurality of sample images by an encoder of a second GAN;
   clustering the plurality of sample images to at least one cluster, based on the latent space vector for each of the plurality of sample images; and
   assigning a classification to each of the at least one cluster, respectively.

8. The method according to claim 7, wherein the plurality of sample images is clustered to at least one cluster, based on the latent space vector for each of the plurality of sample images, by using a Gaussian Mixed Model, GMM.

9. An apparatus for image classification, the apparatus comprising:
   a processor and a memory, the memory containing instructions executable by the processor to configured the processor to:
   pretrain a first Generative Adversarial Network, GAN, using a plurality of sample images with classification information, the pretraining comprising multiple epochs, each epoch comprising:
      training a discriminator of the first GAN with the plurality of sample images with classification information and a plurality of noise images with classification information, while freezing a generator of the first GAN; and
      training the generator of the first GAN with random noise and random classification information, while freezing the discriminator of the first GAN, the generator of the first GAN generating the plurality of noise images and the classification information for the plurality of noise images;
   the discriminator and the generator of the first GAN being trained iteratively; and
   a number of iterative times for the discriminator of the first GAN being larger than a number of iterative times for the generator of the first GAN;
   receive an image to be classified;
   input the image to the discriminator of the first GAN; and
   output a result indicating real and an index of a predetermined classification, or a result indicating fake.

10. The apparatus according to claim 9, further configured to:
    determine that the image belongs to the predetermined classification due to the result indicating real and the index of the predetermined classification.

11. The apparatus according to claim 9, further configured to:
    determine that the image corresponds to an abnormal status due to the result indicating fake.

12. The apparatus according to claim 9, wherein the first GAN is an Auxiliary Classifier Generative Adversarial Network, ACGAN.

13. The apparatus according to claim 9, further configured to:
    generate classification information for the plurality of sample images by using a second GAN.

14. The apparatus according to claim 13, wherein the second GAN is a Bidirectional Generative Adversarial Network, BiGAN.

15. The apparatus according to claim 13, wherein the apparatus for image classification is further configured to:
    collect the plurality of sample images without classification information;
    generate a latent space vector for each of the plurality of sample images by an encoder of a second GAN;
    cluster the plurality of sample images to at least one cluster, based on the latent space vector for each of the plurality of sample images; and
    assign a classification to each of the at least one cluster, respectively.

16. The apparatus according to claim 15, wherein the plurality of sample images is clustered to at least one cluster, based on the latent space vector for each of the plurality of sample images, by using a Gaussian Mixed Model, GMM.

* * * * *